United States Patent
Avadhanula et al.

(10) Patent No.: US 10,146,672 B2
(45) Date of Patent: Dec. 4, 2018

(54) METHOD AND SYSTEM FOR AUTOMATED USER INTERFACE (UI) TESTING THROUGH MODEL DRIVEN TECHNIQUES

(71) Applicant: Tata Consultancy Services Limited, Mumbai (IN)

(72) Inventors: Yugesh Avadhanula, Hyderabad (IN); Jyoti Joshi, Pune (IN); Subbarao Siram, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 71 days.

(21) Appl. No.: 15/465,493

(22) Filed: Mar. 21, 2017

(65) Prior Publication Data
US 2017/0277624 A1    Sep. 28, 2017

(30) Foreign Application Priority Data

Mar. 22, 2016    (IN) .............................. 201621010029

(51) Int. Cl.
| | |
|---|---|
| *G06F 9/44* | (2018.01) |
| *G06F 11/36* | (2006.01) |
| *G06F 8/35* | (2018.01) |
| *G06F 9/451* | (2018.01) |

(52) U.S. Cl.
CPC ............ *G06F 11/3684* (2013.01); *G06F 8/35* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 7,337,432 B2 | 2/2008 | Dathathraya et al. | |
| 8,117,591 B1* | 2/2012 | Michelsen | G06F 8/34 717/109 |
| 9,135,714 B1* | 9/2015 | Gauf | G06T 7/0085 |
| 2008/0155515 A1* | 6/2008 | Stewart | G06F 11/3664 717/135 |
| 2009/0172647 A1* | 7/2009 | Telang | G06F 11/3664 717/135 |
| 2009/0217302 A1 | 8/2009 | Grechanik et al. | |
| 2014/0101640 A1* | 4/2014 | Romdhane | G06F 11/3684 717/125 |
| 2016/0217062 A1* | 7/2016 | Singi | G06F 11/3664 |

FOREIGN PATENT DOCUMENTS

EP    1 890 235 A1    2/2008

* cited by examiner

*Primary Examiner* — Philip Wang
(74) *Attorney, Agent, or Firm* — Finnegan, Henderson, Farabow, Garrett & Dunner, L.L.P.

(57) ABSTRACT

A method and system for automated UI testing through model driven techniques where the UI test case model is generated based on the selected UI model content. The system selects the UI model corresponding to which test case model is created and populated into a test case editor using a test case model creation module. In one embodiment, the test case model before being populated into the test case editor is created as a sequence of UI Actions based on a structure pattern of the selected UI model. In another embodiment, the test case editor displays and edits the test case model. A validation module, based on rules and constraints then validates the test case model against the corresponding UI model. Thereafter, a script generation module generates a test case script from the test case model for the selected UI model.

16 Claims, 5 Drawing Sheets

METHOD AND SYSTEM FOR AUTOMATED USER INTERFACE (UI) TESTING THROUGH MODEL DRIVEN TECHNIQUES

PRIORITY CLAIM

This U.S. patent application claims priority under 35 U.S.C. § 119 to: India Application No. 201621010029, filed on Mar. 22, 2016. The entire contents of the aforementioned application are incorporated herein by reference.

TECHNICAL FIELD

This disclosure relates generally to user interface (UI) test case modeling, and more particularly to a method and system for creating test case model by utilizing underlying model driven UI generation framework.

BACKGROUND

The User Interface (UI) of an application includes a large number of elements such as dialogs (e.g. pop-up windows, screens etc.) each of which may contain one or more controls, such as text areas or boxes, buttons with text etc. As a product is developed, the UI element changes and this can introduce defects or bugs in the UI which could well lead to critical failure of the application. Aggravating the problem is that application developers are under pressure to continually add new features, update the UI, and release new versions of applications. As a result, it is rarely the case that the original test script can adequately test the subsequent revised application.

The existing works have recognized that manually testing the UI applications is tedious, error prone, and arduous. Thus, a majority of existing solutions relies on automating testing of the UI applications. In order to automate testing of UI applications, test engineers write programs using scripting languages (e.g., JavaScript and VBScript). Writing UI automation test scripts is a challenging activity requiring sound working knowledge of the test scripting language being used to write the test cases. Further, manually writing UI Automation test cases require considerable trial and error and effort consuming. Additionally, in case of any updates or modifications in the test scripting language syntax or requirement to write the test scripts in a different scripting language significant amount of effort is involved owing to rework.

Furthermore, the conventional techniques requires that test data for manual automation test cases should necessarily be manually specified for each test case which makes creating regression tests using same test case with different test data a tedious and effort consuming activity.

The aforementioned testing problems are compounded by the fact that the same application is expected to operate identically on a number of different computer operating systems. For example, a Windows application is typically expected to work with all, or most of the Microsoft operating systems currently in use by the public.

Some of the prior art literatures disclose generating test cases directly from user interfaces. The process of generating test cases directly from the user interfaces are technology or platform driven and not technology or platform independent which substantially increases the effort required for implementing, maintaining or migrating the test cases. Additionally, implementing, maintaining or migrating the test cases become more challenging in the event of UI undergoing changes.

The other set of prior art literatures utilizes abstract models for test script generation i.e. implementing model based test code generation for software testing. However, the prior art literatures implement techniques for generating test scripts directly from the existing and already running applications. Generation of test scripts directly from the running applications have the drawback of reduced customizability with which the test scripts are executed. Another impediment of the existing arts lies in automating the generation of test cases for testing the UI models during runtime.

It would be advantageous if the model driven generation techniques could be leveraged in a manner such that the test case specification is segregated from the implementation. There lies a need to have a mechanism to automate generation of test cases with better customizability in terms of independence from technology, platform, scripting language and the likes. Thus, leveraging model driven techniques for automatic generation and validation of test cases are still considered as one of the biggest challenges of the technical domain.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method and system for automated UI testing through model driven techniques.

In an embodiment a method for automated UI testing through model driven techniques is disclosed. The method comprising a processor configured to select a (UI) model; the processor is further configured to create a test case model for the selected UI model and populating the created test case model into a test case editor (222), wherein the test case model is created as a sequence of UI Actions based on a structure pattern of the selected UI model; the processor is further configured to validate the test case model for the selected UI model. Further, the processor is configured to generate a test case script from the test case model for the selected UI model.

In another embodiment the present application discloses a system (102) for automated UI testing through model driven techniques. The system (102) comprises a processor (202) and memory (206) coupled to said processor, the system further comprises a selection module (210) configured to select a User Interface (UI) model. The system further comprises a test case model creation module (212) configured to create a test case model for the selected UI model and populate the created test case model into a test case editor (222) wherein the test case model is created as a sequence of UI actions based on a structure pattern of the selected UI model. The system further comprises a validation module (214) configured to validate the test case model for the selected UI model. Furthermore, the system comprises a script generation module (216) configured to generate a test case script from the test case model for the selected UI model.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
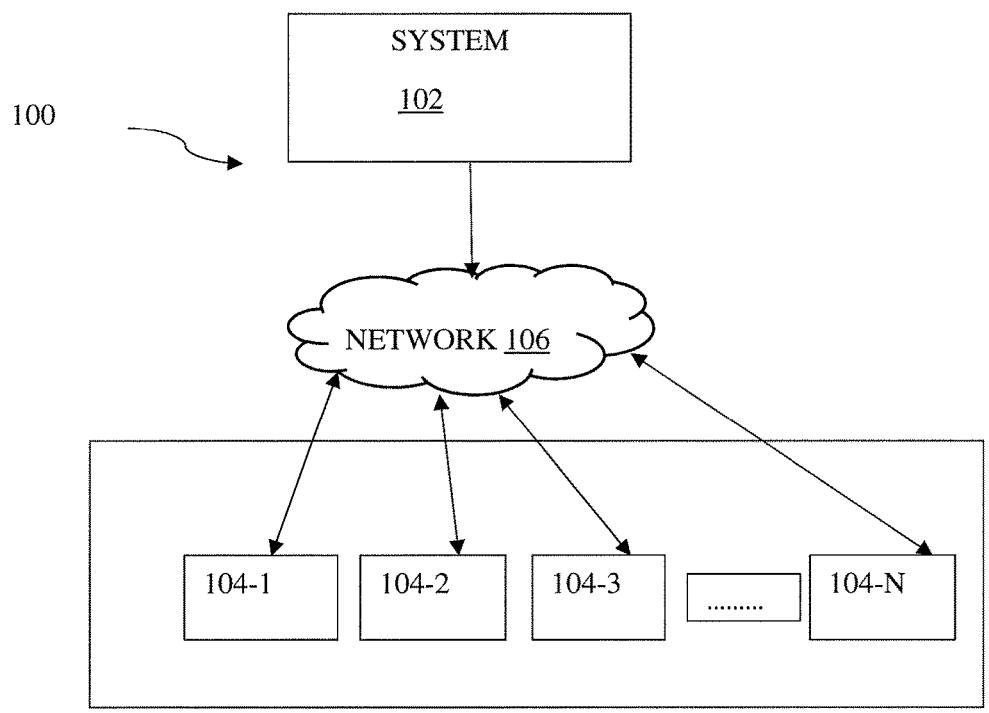
FIG. 1 shows a network implementation illustrating a system (102) for automated UI testing through model driven techniques.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

The present application provides a computer implemented method and system for automated UI testing through model driven techniques.

FIG. 1 illustrates a network implementation of a system for automated UI testing through model driven techniques in accordance with an embodiment of the present subject matter. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network

106 may include a variety of network devices, including routers, bridges, servers, computing devices, storage devices, and the like.

Figure 2:
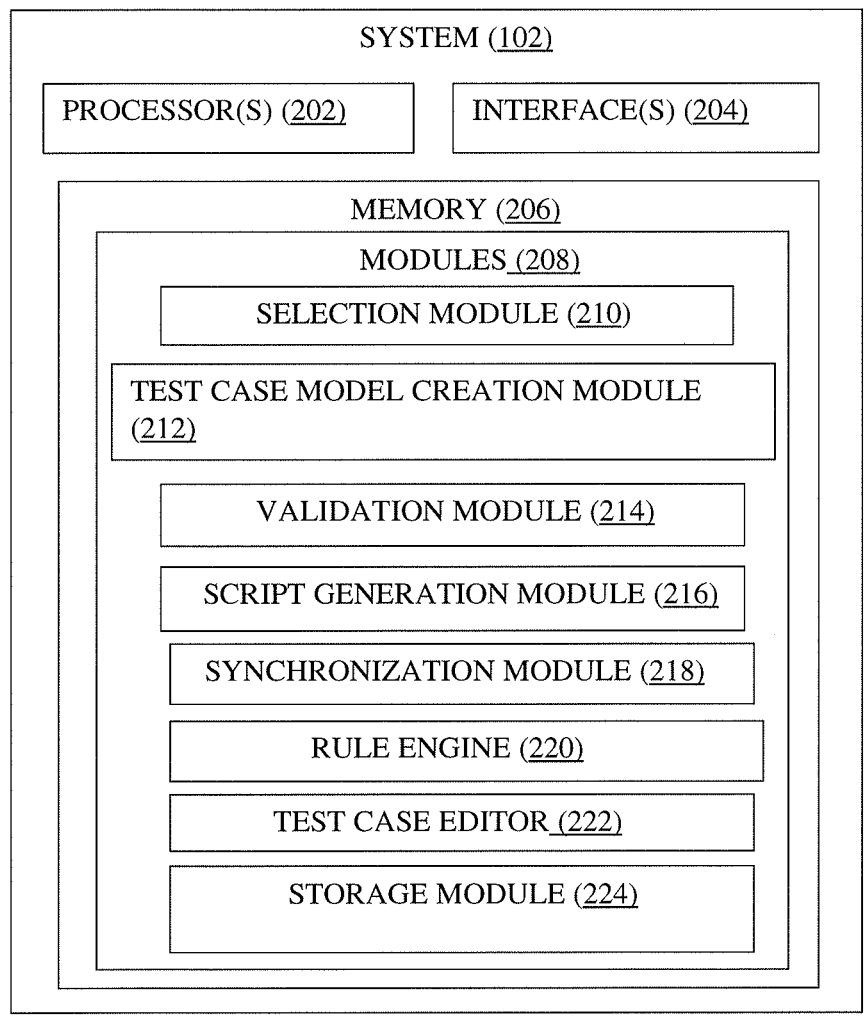
FIG. 2: shows a block diagram illustrating the system (102) for automated UI testing through model driven techniques.

Referring to FIG. 2, a detailed working of the various components of the system 102, in accordance with an embodiment of the disclosed subject matter, are described.

In one embodiment of the invention, referring to FIG. 2 a system for automated UI testing through model driven techniques is disclosed. In one embodiment, the system (102) comprises a processor (202) and a memory (206) communicatively coupled to said processor to perform functions by executing instructions stored in the memory. In another embodiment, the system comprises a selection module (210) configured to select the UI model corresponding to the UI from such application which requires UI testing. In another embodiment, the UI models corresponding to the one or more applications are stored in a storage module (224). Further, a test case model creation module (212) may be configured to create a test case model for the selected UI model and populate the created test model into a test case editor (222). In one aspect, the test case model may be created as a sequence of UI actions based on a structure pattern of the selected UI model. In another aspect, the test case editor (222) may be configured to display the test case model and edit the test case model. In yet another aspect, the test case editor (222) may be configured to edit the test case model by adding new steps, modifying existing steps, recording existing steps and deleting existing steps of the test case model.

Further, the system comprises a validation module (214) configured to validate the test case model against the corresponding UI model. The validation of the test case model may comprise assessing the test case model based on a rule engine (220). The rule engine (220) may comprise a set of predefined rules and constraints which ensures the integrity, consistency and correctness of the test case model. Further, the validation of the test case model may include but not limited to syntactic and semantic assessment of a test case model against a UI model. In an embodiment, the said rules and constraints may be encoded in a script which when executed, assesses whether the test case model adheres to each of said rules and constraints encoded in script. In the event of violation, the validation is marked as failed. For example, a field which takes an integer value cannot be mapped to a String type service parameter. Thereafter, a script generation module (216) may be configured to generate a test case script from the validated test case model for the target platform. Further, the generated test script being used to test the corresponding UI application.

In an embodiment, a test case model creator module (212) may be configured to create a test case model for the specified UI model before populating the created test case model into a test case editor (222). The creation of a test case model for the specified model may be based on (i) Event-centric approach (ii) User-interaction centric approach or a combination of Event- centric approach and User-interaction centric approach. The selection of the said models may be based upon the consideration whether the user interface (UI) is at the development stage or it has been developed. In a preferred embodiment, the Event-centric approach may be used for modelling of test cases during UI development when there is a need for unit testing individual events in an in-progress UI screen. In another preferred embodiment, User-interaction centric approach may be used for modelling of test cases when there is a need for testing an already implemented UI screen from a User-interaction centric approach. It would be evident to the person skilled in the art at the time of presenting the subject matter of this application that the test case model may be created based on the combination of Event-centric steps and User-interaction centric steps which may be implemented based on the Event-centric approach and User-interaction centric approach as elucidated in FIG. 4 and FIG. 5 respectively.

In another embodiment, a synchronization module (218) may be configured to synchronize the test case model for the selected UI model with the selected UI model as a sequence of UI Actions based on a structure pattern of the selected UI model. Due to the randomness of the UI actions there occurs changes in the UI model. In order to ensure that the changes in the UI model are automatically synchronized with the test case model for the selected UI model the system implements the synchronization module (218). Further, the synchronization module (218) is configured to monitor the changes in the UI model and automatically synchronizing the changes with the corresponding test case model.

In yet another embodiment, a test case editor (222) may be configured to display the test case models and provide a handle for the users to add new steps, modify existing steps, record existing steps and delete existing steps. Further, the test case editor (222) provides handle to trigger validation of the test case models and generation of test scripts from the test case models. Furthermore, the test case editor (222) may be configured to automatically refresh and reflect the changes occurring in the test case model corresponding to the changes in the UI model.

In yet another embodiment, a storage module (224) as a part of the Model driven UI modelling and generation framework may be configured to store and access one or more UI models corresponding to one or more applications. The storage module (224) may also be configured to store and access the test case model and the edited test case model along with the UI model.

In an embodiment, the test scripts generated from the validated test case model using a script generation module (216) may be executed in an automated execution system using a test execution engine. The automated execution system configured to suit to the environment in which the test scripts along with test data shall be executed. The execution of the test scripts further produce the test results to verify that the UI application performs as expected.

Although embodiments for methods and systems for the present subject matter have been described in a language specific to structural features and/or methods, it is to be understood that the present subject matter is not necessarily limited to the specific features or methods described. Rather, the specific features and methods are disclosed as exemplary embodiments for the present subject matter.

Figure 3:
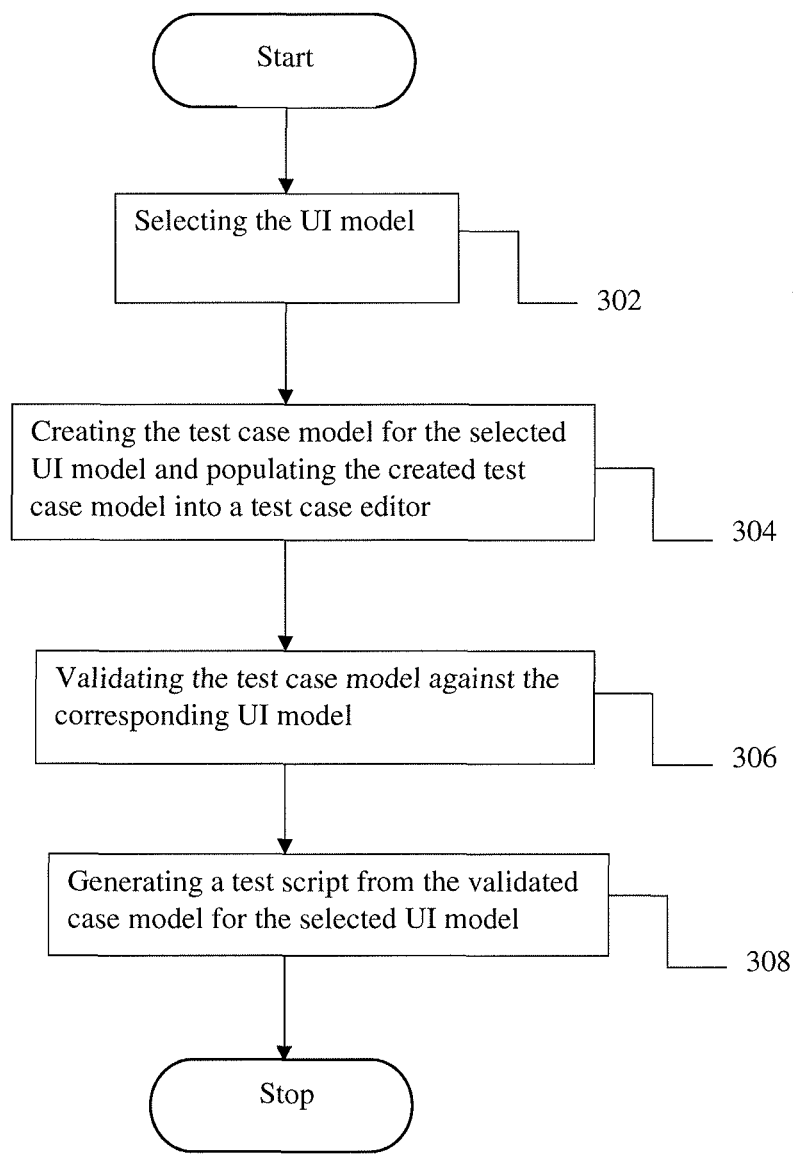
FIG. 3: shows a flowchart illustrating a method for automated UI testing through model driven techniques.

FIG. 3 is a flowchart illustrating the method for automated UI testing through model driven techniques as per an embodiment of the subject matter disclosed herein. As per the illustration of FIG. 2 the automatic UI test case modelling and generation framework uses an underlying model driven UI generation framework.

The process starts at step 302, wherein the selection of stored User Interface (UI) model is performed. The selection of UI model serves as a penultimate step for creating the test case model since the test case model is created corresponding to the selected UI model.

At the step 304, the test case model created from the selected UI model populated into the test case editor. In one aspect, the test case model may be created automatically as a sequence of UI Actions based on a structure pattern of the selected UI model. In another aspect, the test case model may be created from scratch and edited. In yet another aspect, editing the populated test case model may be performed by adding new steps, modifying existing steps, recording existing steps and deleting existing steps of the test case model. In an embodiment, a test case model is created corresponding to the selected UI model wherein the creation of test case model may be based on (i) Event-centric approach (ii) User-interaction centric approach or a combination of both Event- centric and User-interaction centric approaches. The selection of the said models may be based upon the consideration whether the user interface (UI) is at the development stage or it has been developed. In a preferred embodiment, the Event- centric model may be used for modelling of test cases during UI development when there is a need for unit testing individual events in an in-progress UI screen. In another preferred embodiment, User-interaction centric model may be used for modelling of test cases when there is a need for testing an already implemented UI screen from a User-interaction centric approach. In another embodiment, synchronization of the test case model for the selected UI model with the selected UI model is performed based on the sequence of UI Actions obtained from a structure pattern of the selected UI model. Due to the randomness of the UI actions there occurs changes in the UI model. In order to ensure that the changes in the UI model are automatically synchronized with the test case model selected corresponding to the UI model, the changes in the UI model are monitored and in case any changes are observed, the changes are automatically synchronized with the corresponding test case model resulting in an updated test case model.

At the step 306, the test case model is validated against the corresponding UI model. The validation of the test case model may comprise assessing the test case model based on a set of predefined rules and constraints which ensures the integrity of the test case model. Further, the validation of the test case model may include but not limited to syntactic and semantic assessment of a test case model against a UI model. In an embodiment, the said rules and constraints may be encoded in a script which when executed, assesses whether the test case model adheres to each of said rules and constraints encoded in script. In the event of violation, the validation is marked as failed. For example, a field which takes an integer value cannot be mapped to a String type service parameter.

The process ends at the step 308, wherein the test script may be generated from the validated test case model for the target platform. Further, the generated test script being used to test the corresponding UI application. In an embodiment, the UI model, the test case model and the edited test case model may be stored and accessed from a storage module (224).

It will be appreciated by a person skilled in the art that although the method of FIG. 3 illustrates a method of working the disclosed subject matter, however the method may be used in any order with omissions of one or more steps or by performing any step in any order and the same forms a part of the disclosed subject matter.

Figure 4:
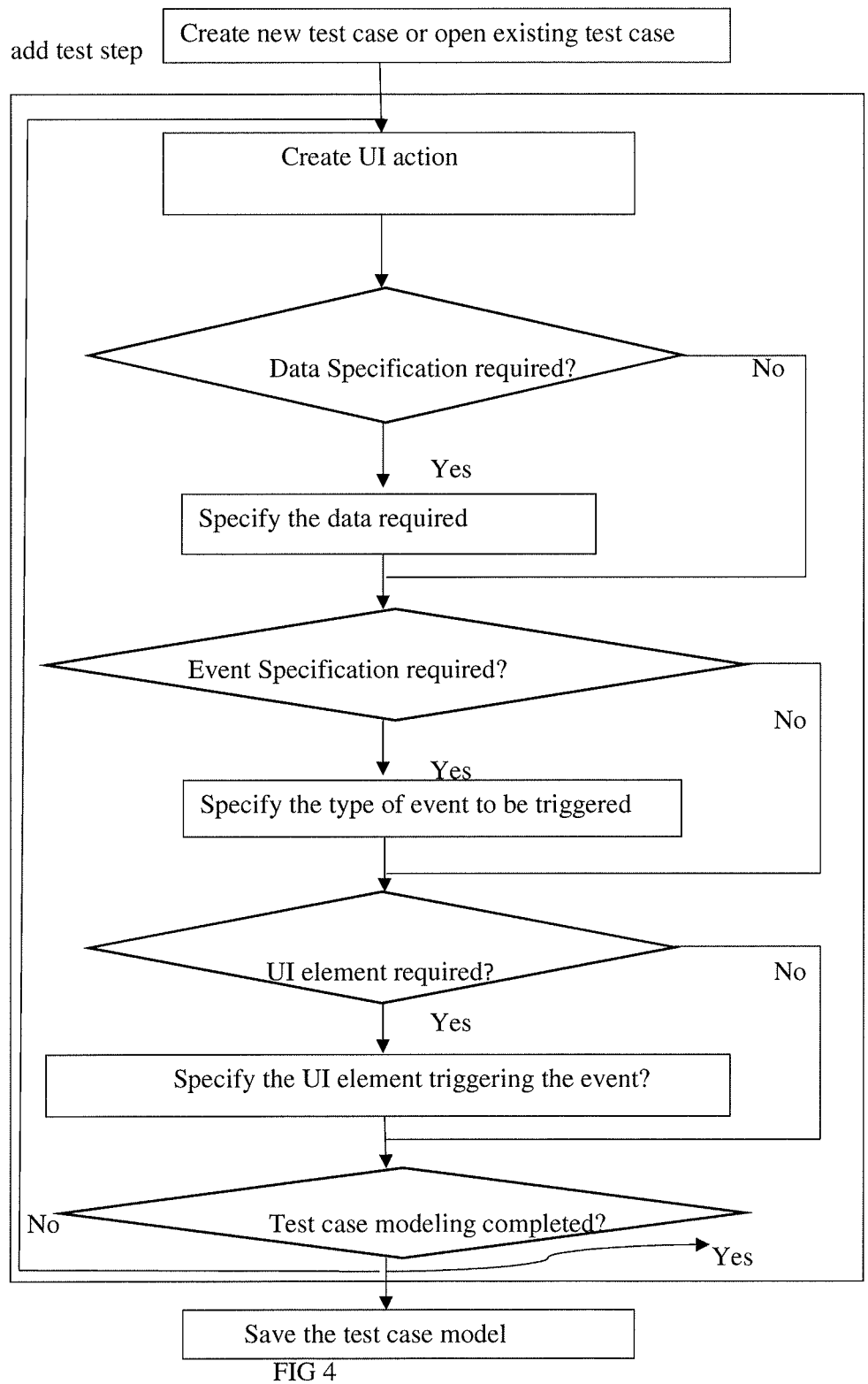
FIG. 4: shows a flowchart illustrating a high level process for creation of a test case model corresponding to the selected UI model utilizing the Event-centric approach.

Referring to FIG. 4 is a flowchart illustrating a high level process for creation of a test case model corresponding to the selected UI model utilizing the Event-centric approach.

In an embodiment, FIG. 4 is an illustration of the application of Event-centric approach for creation of a test case model corresponding to the selected UI model. As illustrated by FIG. 4 the event-centric approach comprises creating a test or opening of the existing test case. Further, the process involves adding the test step to the said created test case or the existing test case. The test steps are added to the test case until the modelling of the test case is complete. In the event wherein the test case modelling is completed and no more test steps remain to be added to the test case the UI action is saved. In the event of test case modelling not being completed the test step may be added to the test case for creating the UI action. Furthermore, the process comprises steps of checking for requirements of data specification, event specification and UI element specification. Further, the process based on the said requirements, prompts the user to specify data specification, event specification and UI element triggering the said event in case any one of the data specification, event specification and UI element triggering the said event are required. The said process keeps repeating until test case modelling is completed and the UI action saved.

In an exemplary embodiment, referring to FIG. 4 an illustration is presented elucidating a specific UI action in an Event-centric approach. For example, the UI action for creating a UI action for setting data in a text box which serves as one of the inputs to the service comprises the steps of (i) creating UI action (ii) data to be set in the text box is specified; (iii) select the required text box into which data needs to be set. The process ends with saving the UI action in saving the test case in case the test case modelling is completed else the process repeats by creating new UI action/test step or modifying/deleting existing UI action/test step.

In another exemplary embodiment, referring to FIG. 4 an illustration is presented elucidating a specific UI action in an Event-centric approach. For example, the UI action for triggering the click event of the button which in turn invokes the service comprises the steps of (i) creating UI action; (ii) event specification specified as click event; (iii) selection of the button as the UI element triggering the event. The process ends with saving the test case in case the test case modelling is completed else the process repeats by creating new UI action/test step or modifying/deleting existing UI action/test step.

In yet another exemplary embodiment, referring to FIG. 4 an illustration is presented elucidating a specific UI action in an Event-centric approach. For example, the UI action for asserting the data set into a text box by the service comprises the steps of (i) creating UI action; (ii) specifying expected data from the service and (iii) specifying the text box into which data from service is set. The process ends with saving the test case in case the test case modelling is completed else the process repeats by creating new UI action/test step or modifying/deleting existing UI action/test step.

Figure 5:
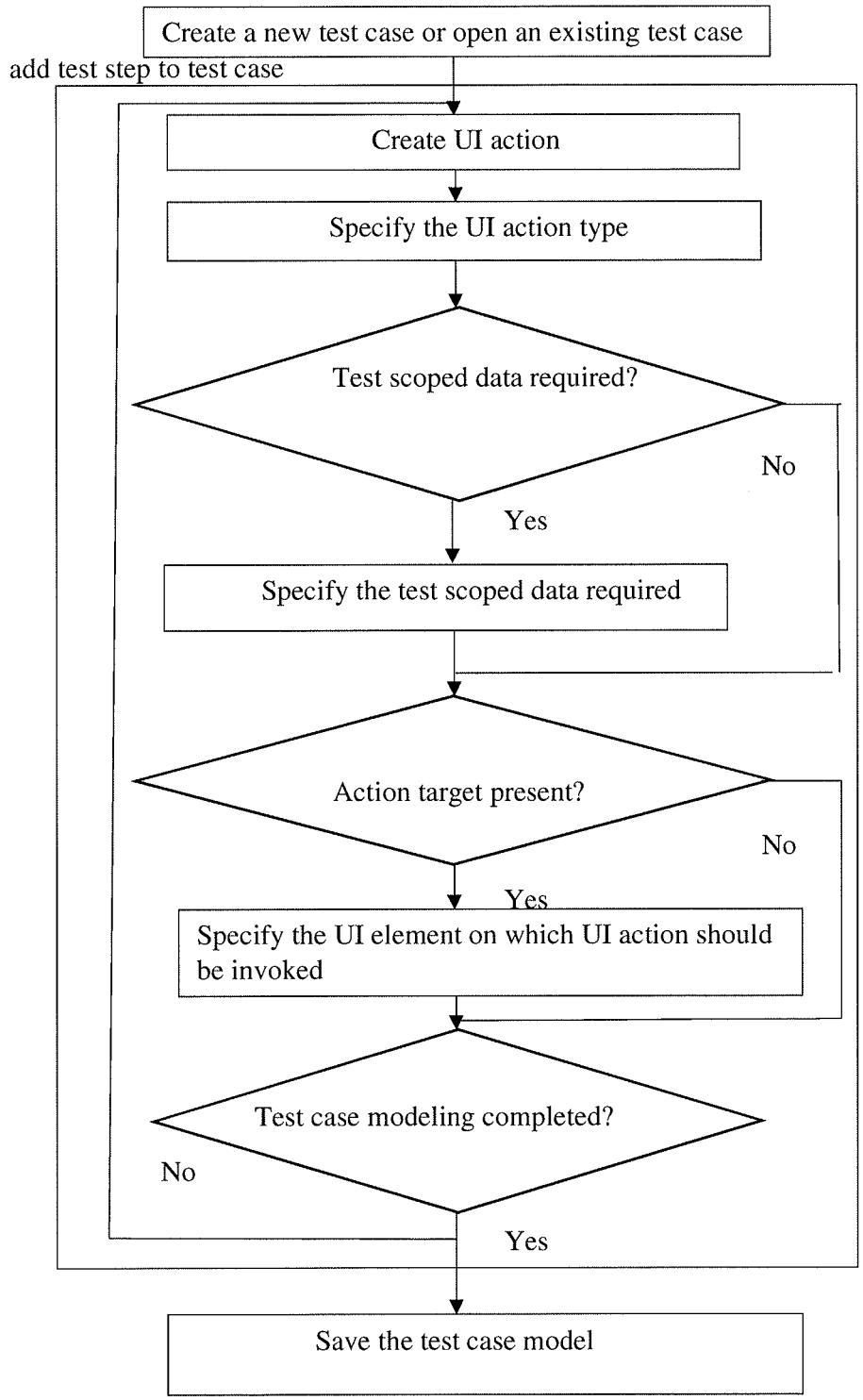
FIG. 5: shows a flowchart illustrating a high level process for creation of a test case model corresponding to the selected UI model utilizing the User-interaction centric approach.

Referring to FIG. 5 is a flowchart illustrating a high level process for creation of a test case model corresponding to the selected UI model utilizing the User-interaction centric approach.

In an embodiment, FIG. 5 is an illustration of the application of User-interaction centric model for creation of a test case model corresponding to the selected UI model. As illustrated by FIG. 5 the User- interaction centric approach comprises creating a text case or opening of the existing test case. Further, the process involves adding the test step to the said created test case or the existing test case. The test steps are added to the test case until the modelling of the test case is complete. In the event wherein the test case modelling is completed and no more test steps remain to be added to the test case the UI action is saved. In the event of test case modelling not being completed the test step may be added to the test case for creating the UI action and specifying the UI action type. Furthermore, the process comprises steps of checking for requirements of test scoped data and presence of Action target. Further, the process involves prompting the user to specify test scoped data in case test scoped data is required and UI element specification for invoking UI action in case the action target is found to be present. The said process keeps repeating until test case modelling is completed and the UI action saved.

In an exemplary embodiment, referring to FIG. 5 an illustration is presented elucidating a specific UI action in a User- interaction centric approach. For example, the UI action for setting data in a text box which serves as one of the inputs to the service comprises the steps of (i) creating UI action; (ii) selecting "set data" as the UI action type; (iii) selecting the required text box as the action target. The process ends with saving the test case in case the test case modelling is completed else the process repeats by creating new UI action/test step or modifying/deleting existing UI action/test step.

In another exemplary embodiment, referring to FIG. 5 an illustration is presented elucidating a specific UI action in a User- interaction centric approach. For example, the UI action for clicking the button comprises the steps of (i) creating UI action; (ii) selecting "click" as the UI action type; (iii) selecting the button as the action target on which the click UI action type is invoked. The process ends with saving the test case in case the test case modelling is completed else the process repeats by creating new UI action /test step or modifying/deleting existing UI action/test step.

In yet another exemplary embodiment, referring to FIG. 5 an illustration is presented elucidating a specific UI action in a User-interaction centric approach. For example, the UI action for asserting the data set into a text box by the service comprises the steps of (i) creating UI action; (ii) selecting "assert data" as the UI action type; (iii) selecting the required text box as the action target whose content is asserted with expected data. The process ends with saving the test case in case the test case modelling is completed else the process repeats by creating new UI action/test step or modifying/ deleting existing UI action/test step.

The techniques as disclosed in the present application for generating UI test case models from UI models with predefined structure patterns saves the effort and time in manually creating the test case models. Further, creating UI test case models from UI models ensures synchronization between the UI and the test cases. Furthermore, generating test case scripts from test case models eliminates rework while making upgrades to test case scripting technology or during migration to newer technologies. The method and system disclosed also facilitates the test case implementers to focus on implementing the test case in a technology independent manner which in provides the testing professionals flexibility to choose the requisite test case generation technology.

In an embodiment, the UI actions obtained from a structure pattern of the selected UI model UI actions comprises UI actions well known in the art. For example, the UI actions may include but not limited to click, double-click or drag text, tree nodes and controls inside the application under test, minimize and maximize windows, focus controls, setting a string in a text box, asserting the data in a drop down, clicking the button and other standard UI actions.

In an embodiment, the test scripting languages used in automated testing may include but not limited to JavaScript, Perl, Python, Ruby, Tcl, Unix Shell script, VBscript, Sikuli. The present invention implements system and method for automated generation of (UI) test script generation from a UI model. The test scripts may be written using any of the aforementioned scripting languages along with the others well known in the art.

It is intended that the disclosure and examples be considered as exemplary only, with a true scope and spirit of disclosed embodiments being indicated by the following claims.

What is claimed is:

1. A method for automated User Interface (UI) testing through model driven techniques, the method comprising processor implemented steps of:
    selecting the (UI) model using a selection module (210);
    creating a test case model for the selected UI model and populating the created test case model into a test case editor (222) using a test case model creation module (212), wherein the test case model is created as a sequence of UI Actions based on a structure pattern of the selected UI model;
    validating the test case model for the selected UI model using a validation module (214);
    generating a test case script from the test case model for the selected UI model using a script generation module (216).

2. The method of claim 1 wherein the test case model for the selected UI model is created as the sequence of UI actions, and wherein the sequence of UI actions comprises at least one of an event-centric approach, and a user-interaction centric approach.

3. The method of claim 1 further comprising synchronizing of the test case model for the selected UI model with the selected UI model as the sequence of UI Actions based on the structure pattern of the selected UI model using a synchronization module (218).

4. The method of claim 1 wherein validation comprises assessing the test case model based on a rule engine (220) such that the rule engine (220) comprises a set of predefined rules.

5. The method of claim 1 further comprising displaying the test case model and editing the test case model using a test case editor (222), wherein the test case editor (222) edits the test case model by at least one of, adding new steps, modifying existing steps, recording existing steps and deleting existing steps of the test case model.

6. A system (102) for automated User Interface (UI) testing through model driven techniques comprising a processor (202) and memory (206) coupled to said processor, the system comprising:
    a selection module (210) configured to select a UI model;
    a test case model creation module (212) configured to create a test case model for the selected UI model and populate the created test case model into a test case editor (222) wherein the test case model is created as a sequence of UI Actions based on a structure pattern of the selected UI model;
    a validation module (214) configured to validate the test case model for the selected UI model;
    a script generation module (216) configured to generate a test case script from the test case model for the selected UI model.

7. The system of claim 6 wherein the test case model for the selected UI model is created as the sequence of UI actions, and wherein the sequence of UI actions comprises at least one of an event-centric approach, and a user-interaction centric approach.

8. The system of claim 6 further comprising a synchronizing module (218) configured to synchronize the test case model for the selected UI model with the selected UI model as the sequence of UI Actions based on the structure pattern of the selected UI model.

9. The system of claim 6 wherein validation comprises assessing the test case model based on a rule engine (220) such that the rule engine comprises a set of predefined rules.

10. The system of claim 6 further comprising a test case editor (222) configured to display the test case model and edit the test case model, wherein the test case editor (222) edits the test case model by at least one of, adding new steps, modifying existing steps, recording existing steps and deleting existing steps of the test case model.

11. The system of claim 6 further comprising a storage module (224) configured to store and access at least one of the UI model, the test case model, and the edited test case model.

12. One or more non-transitory machine readable information storage mediums comprising one or more instructions which when executed by one or more hardware processors causes:
   selecting the (UI) model using a selection module (210);
   creating a test case model for the selected UI model and populating the created test case model into a test case editor (222) using a test case model creation module (212), wherein the test case model is created as a sequence of UI Actions based on a structure pattern of the selected UI model;
   validating the test case model for the selected UI model using a validation module (214);
   generating a test case script from the test case model for the selected UI model using a script generation module (216).

13. The one or more non-transitory machine readable information storage mediums of claim 12, wherein the test case model for the selected UI model is created as the sequence of UI actions, and wherein the sequence of UI actions comprises at least one of an event-centric approach, and a user-interaction centric approach.

14. The one or more non-transitory machine readable information storage mediums of claim 12, wherein validation comprises assessing the test case model based on a rule engine (220) such that the rule engine (220) comprises a set of predefined rules.

15. The one or more non-transitory machine readable information storage mediums of claim 12, further comprising a synchronizing module (218) configured to synchronize the test case model for the selected UI model with the selected UI model as the sequence of UI Actions based on the structure pattern of the selected UI model.

16. The one or more non-transitory machine readable information storage mediums of claim 12, further comprising displaying the test case model and editing the test case model using a test case editor (222), wherein the test case editor (222) edits the test case model by at least one of, adding new steps, modifying existing steps, recording existing steps and deleting existing steps of the test case model.

* * * * *